(12) United States Patent
Jiang et al.

(10) Patent No.: US 10,686,736 B1
(45) Date of Patent: Jun. 16, 2020

(54) TECHNIQUES FOR DATA STORAGE SYSTEM MANAGEMENT

(71) Applicant: EMC IP Holding Company LLC, Hopkinton, MA (US)

(72) Inventors: Zihao Jiang, Shanghai (CN); Jiajie Sun, Shanghai (CN); Zhenzan Zhou, Shanghai (CN); Haitao Zhou, Shanghai (CN); Minggang Lu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 175 days.

(21) Appl. No.: 15/473,872

(22) Filed: Mar. 30, 2017

(51) Int. Cl.
G06F 15/16 (2006.01)
H04L 12/58 (2006.01)
G06F 16/33 (2019.01)
H04L 9/08 (2006.01)
H04L 29/06 (2006.01)

(52) U.S. Cl.
CPC .......... H04L 51/04 (2013.01); G06F 16/3344 (2019.01); H04L 9/0844 (2013.01); H04L 67/42 (2013.01)

(58) Field of Classification Search
None
See application file for complete search history.

(56) References Cited

U.S. PATENT DOCUMENTS

| | | | |
|---|---|---|---|
| 9,081,594 B1 * | 7/2015 | Labonte | G06F 9/44521 |
| 2006/0080284 A1 * | 4/2006 | Masonis | H04L 67/306 |
| 2011/0307562 A1 * | 12/2011 | Chakra | G06Q 10/10 |
| | | | 709/206 |
| 2014/0143265 A1 * | 5/2014 | Kim | H04M 1/72555 |
| | | | 707/758 |
| 2015/0199534 A1 * | 7/2015 | Francis | G06F 21/6218 |
| | | | 726/28 |
| 2015/0229636 A1 * | 8/2015 | Scavo | H04L 29/06 |
| | | | 726/8 |
| 2016/0055697 A1 * | 2/2016 | Raina | G07C 9/00309 |
| | | | 340/5.7 |

(Continued)

OTHER PUBLICATIONS

Brian R. Tetreault, et al., EMC Corporation, "Artificial Intelligence for Infrastructure Management", U.S. Appl. No. 15/196,592, filed Jun. 29, 2016.

*Primary Examiner* — Dhairya A Patel
(74) *Attorney, Agent, or Firm* — Muirhead and Saturnelli, LLC

(57) ABSTRACT

Techniques for issuing a data storage management request may include: receiving, from a client at a data storage system, a set of one or more messages; performing natural language processing on the set of one or more messages to extract first information used in forming the data storage management request; executing the data storage management request in accordance with the first information extracted; and responsive to executing the request, sending a response to the client indicating a result of executing the data storage management request. State information may be retained in connection with a first conversation to obtain information for a first request or command. If the first conversation is interrupted to commence a second conversation for a second request, the state information may be stored for the duration of the second conversation and then restored to resume the first conversation from the point of interruption.

19 Claims, 7 Drawing Sheets

(56) References Cited

U.S. PATENT DOCUMENTS

| | | | |
|---|---|---|---|
| 2016/0143028 A1* | 5/2016 | Mancuso | H04L 63/20 370/338 |
| 2017/0104843 A1* | 4/2017 | Cardillo | H04L 69/28 |
| 2018/0189355 A1* | 7/2018 | Sandu | G06F 16/951 |

* cited by examiner

TECHNIQUES FOR DATA STORAGE SYSTEM MANAGEMENT

BACKGROUND

Technical Field

This application generally relates to system management.

Description of Related Art

Systems may include different resources used by one or more host processors. Resources and host processors in the system may be interconnected by one or more communication connections, such as network connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. These may or may not correspond to the actual physical drives. Allowing multiple host systems to access the single data storage system allows the host systems to share data stored therein.

SUMMARY OF THE INVENTION

In accordance with one aspect of the techniques herein is a method of performing a data storage management request comprising: receiving, from a client at a data storage system, a set of one or more messages; performing natural language processing on the set of one or more messages to extract first information used in forming the data storage management request; executing the data storage management request in accordance with the first information extracted; and responsive to said executing, sending a response to the client indicating a result of executing the data storage management request. The data storage system may include an agent. The client may connect to a server, the agent may connect to the server, and the set of one or more messages may be sent from the client to the server, and then from the server to the agent of the data storage system. Each of the messages in the set of one or more messages may be transmitted from the client to the server in accordance with an instant-messaging protocol. The data storage management request may be a request issued over a control path. The client may be a mobile device running an instant-messaging application. The client may be a computer system running a browser. The client may be one of a plurality of clients connected to the server and communicating to the agent, via the server, in a multi-user chat session. A plurality of data storage systems may include the data storage system. The server may communicate with the plurality of data storage systems and the client may issue the data storage system management request, via the server, to each of the plurality of data storage systems through connections between the server and the plurality of data storage systems. The set may include a plurality of messages, and portions of the first information may be incrementally extracted from each message of the set as each message is received at the data storage system from the client. State and context information regarding processing for the data storage system management request may be maintained on the data storage system and updated as each message of the set is processed. Prior to receiving all messages of the set for the data storage management command, the method may include performing first processing comprising: receiving, from the client at the data storage system, a second set of one or more messages; performing natural language processing on the second set of one or more messages to extract second information used in forming a second data storage management request; interrupting, at a first processing point, a first conversation comprising the set of messages for the data storage management request; executing the second data storage management request in accordance with the second information extracted; and subsequent to executing the second data storage management request, resuming the first conversation at the first processing point at which said interrupting occurred. The step of interrupting may include retaining first state and context information denoting a first processing state of the data storage management request when interrupted. The step of resuming may include restoring the first processing state of the data storage management request as a current processing state in connection with the data storage management request.

In accordance with another aspect of techniques herein is a system comprising: a processor; and a memory comprising code stored thereon that, when executed by the processor, performs a method of issuing a data storage management request comprising: receiving, from a client at a data storage system, a set of one or more messages; performing natural language processing on the set of one or more messages to extract first information used in forming the data storage management request; executing the data storage management request in accordance with the first information extracted; and responsive to said executing, sending a response to the client indicating a result of executing the data storage management request.

In accordance with another aspect of techniques herein is a computer readable medium comprising code stored thereon that, when executed, performs a method of issuing a data storage management request comprising: receiving, from a client at a data storage system, a set of one or more messages; performing natural language processing on the set of one or more messages to extract first information used in forming the data storage management request; executing the data storage management request in accordance with the first information extracted; and responsive to said executing, sending a response to the client indicating a result of executing the data storage management request. The data storage system may include an agent. The client may connect to a server, and the agent may connect to the server. The set of one or more messages may be sent from the client to the server, and then from the server to the agent of the data storage system. Each of the messages in the set of one or more messages may be transmitted from the client to the server in accordance with an instant-messaging protocol. The data storage management request may be a request issued over a control path.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
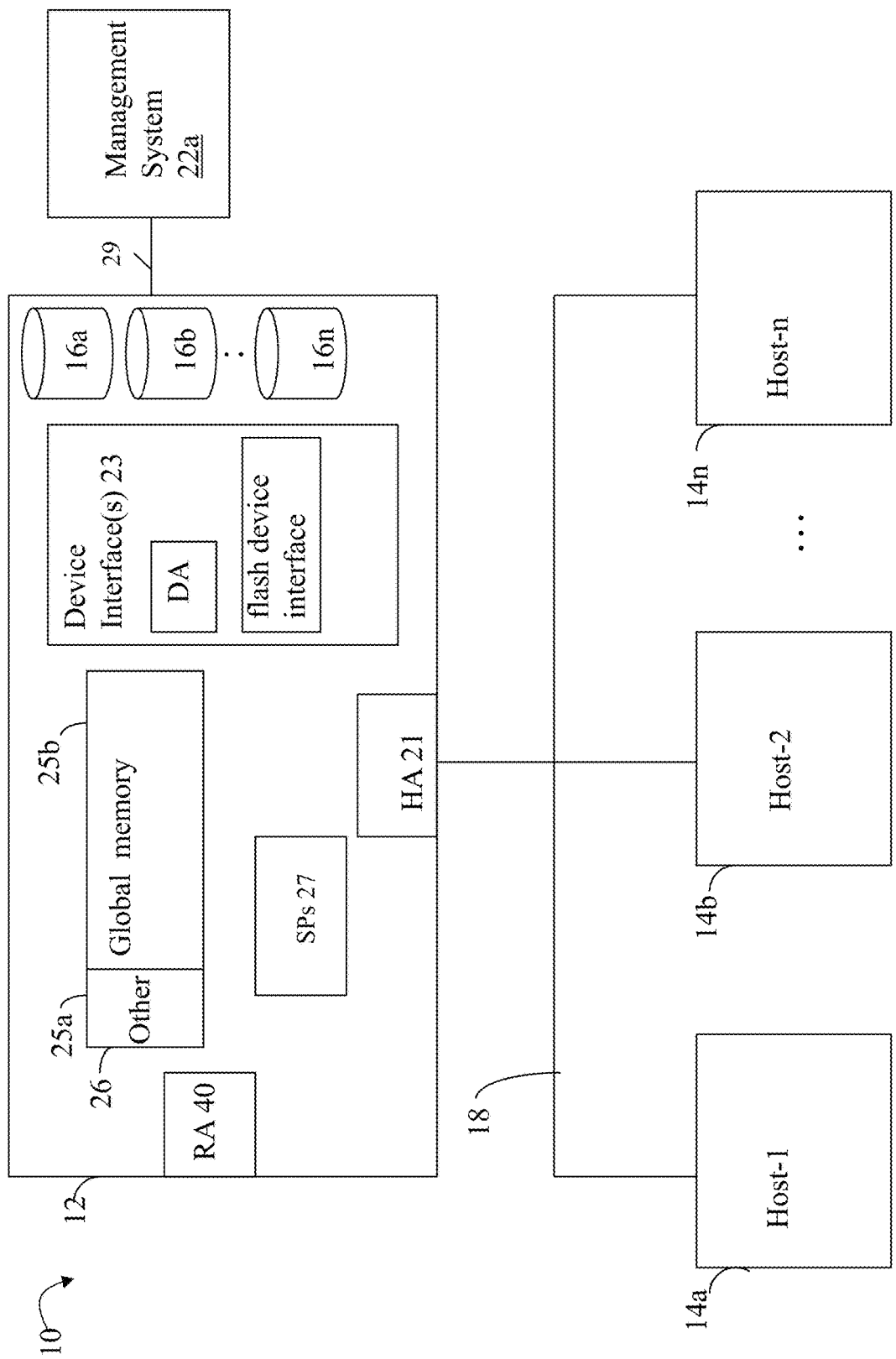
FIG. 1 is an example of components that may be included in a system in accordance with techniques described herein.

Referring to FIG. 1, shown is an example of an embodiment of a system that may be used in connection with performing the techniques described herein. The system 10 includes a data storage system 12 connected to host systems 14a-14n through communication connection 18. In this embodiment of the computer system 10, and the n hosts 14a-14n may access the data storage system 12, for example, in performing input/output (I/O) operations or data requests. The communication connection 18 may be any one or more of a variety of networks or other type of communication connections as known to those skilled in the art. The communication connection 18 may be a network connection, bus, and/or other type of data link, such as a hardwire or other connections known in the art. For example, the communication connection 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication connection 18 by any one of a variety of connections as may be provided and supported in accordance with the type of communication connection 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication connection that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication connection 18 may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of physical data storage devices (PDs or physical devices) such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include one or more SLC (single level cell) devices and/or MLC (multi level cell) devices.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN (s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. The DA which services the particular physical device may perform processing to either read data from, or write data to, the corresponding physical device location for an I/O operation.

Also shown in FIG. 1 is a management system 22a that may be used to manage and monitor the system 12. In one embodiment, the management system 22a may be a computer system, or other device as described in more detail elsewhere herein, where such system or device 22a includes data storage system management software or application such as may execute in a web browser. The system 22a may communicate with the data storage system 12 over any suitable connection 29. Generally, element 29 may be a network connection such as a public internet connection, private intranet connection, and the like. Element 29 may, for example, be any suitable connection similar to the connection 18 described elsewhere herein.

A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

Each of the different adapters, such as HA 21, DA or disk interface, RA, and the like, may be implemented as a hardware component including, for example, one or more processors, one or more forms of memory, and the like. Code may be stored in one or more of the memories of the component for performing processing.

An embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI or block-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to FIG. 1, the control commands may be issued from data storage management software executing on management system 22a to the data storage system 12. Such commands may be, for example, to establish or modify data services, provision storage, perform user account management, create a new logical entity (e.g., RAID group, storage pool), view information on physical and/or logical data entities in a current data storage system configuration (e.g., status and health of physical storage devices, amount of free/available storage in a provisioned LUN, pool, or RAID group) and the like. For example, commands may be issued over the control path to provision storage for LUNs, create a snapshot, define conditions of when to create another snapshot, delete a snapshot, define or establish local and/or remote replication services, define or modify a schedule for snapshot or other data replication services, define/create a RAID group, obtain data storage management and configuration information for display, generally modify one or more aspects of a data storage system configuration, and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

In an embodiment in accordance with techniques herein, the data storage system management application (also referred to herein as the management application) may have a conversational-based UI that processes user input that is a natural language input. A natural language input may be characterized as information, such as an instruction, command, task, operation, query or question, having a form or structure of a spoken, typed or written human language. Examples of natural language inputs may include voice input or commands, text input such as via direct text entry on a device, and the like. In connection with techniques herein, the user input may be provided directly as a form of text that is a natural language input. As a variation, the user input provided may be in the form of speech or voice input which may then be converted, such as using speech/voice to text conversion software known in the art. For example, a user may provide a first natural language input in the form of voice or speech input which may be stored as an audio file. The audio file may then be converted, using speech/voice to text conversion software, to a text file that is also a natural language input (e.g., including text also having a natural language form and structure). Described below are embodiments using techniques herein whereby data storage administrators interact with the data storage management application to perform management tasks using natural language (e.g., chat-based or conversation-based) interface and input rather than generally a menu driven interface. In such an embodiment, the user does not have to locate the proper options and selections from various menus, tabs, buttons, and the like, to perform a desired question, task, command or operation. Rather, the user may provide direct natural language input which is interpreted and processed. The foregoing and other aspects of a conversational, natural language UI and associated components and processing used in connection with data storage system management are described in more detail in following paragraphs.

What will now be described are techniques that may be used in an embodiment to perform data storage system management tasks, commands and/or operations, such as typically issued by the data storage management application over the control path. In at least one embodiment, such management tasks, operations, commands, and the like, may be issued from a client device using instant messaging (IM) and an associated IM protocol, such as the XMPP protocol. As known in the art, XMPP (Extensible Messaging and Presence Protocol) may be characterized as a set of open technologies for instant messaging, presence, multi-party chat, voice and video calls, collaboration, lightweight middleware, content syndication, and generalized routing of XML data.

In accordance with techniques herein, use of IM clients and protocol, such as XMPP, provides techniques for performing data storage system management tasks, operations and commands in conjunction with a chat-based or conversation-based approach using natural language inputs and natural language processing (NLP). Using NLP, various messages may be exchanged with an IM client to obtain necessary information to issue a command or other requested operation. Such information may identify, for example, the particular action performed as well as the target and other, possibly optional, parameters relevant to the command. The IM client may be a device from which a user or data storage administrator issues a data storage system management task, operation or request (e.g., as part of the control path).

Figure 2:
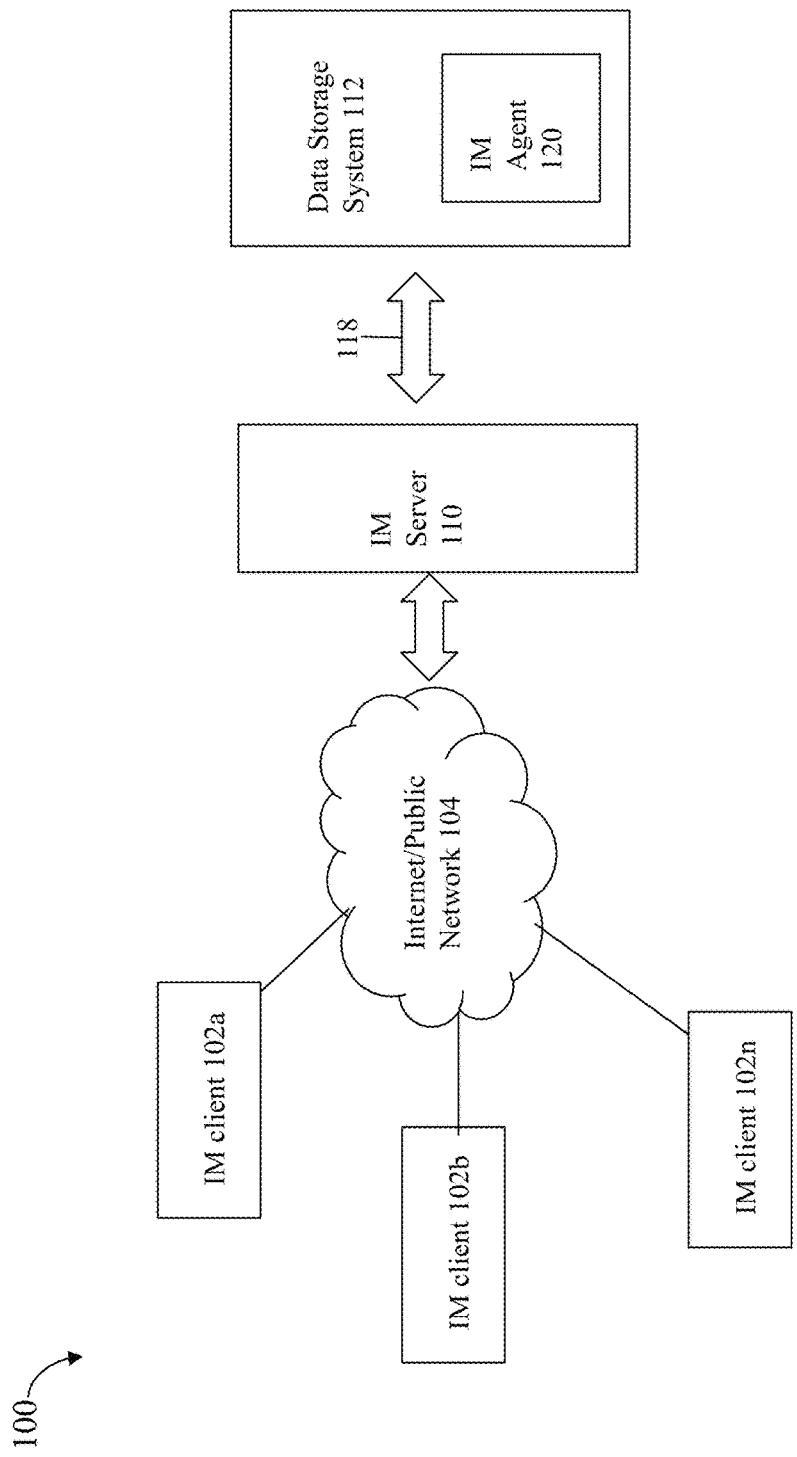
FIGS. 2, 3 and 6 are examples illustrating components that may be included in an embodiment in accordance with techniques herein.

Referring to FIG. 2, shown is an example of components that may be included in an embodiment in accordance with techniques herein. The example 100 includes one or more IM clients 102a-n, the internet or public network 104, an IM server 110, and data storage system 112. The IM clients 102a-n, IM server 110 and IM agent 120 communicate in accordance with a particular IM protocol as described herein.

Each of the IM clients 102a-n may generally be any suitable and compatible client supporting the particular IM protocol used by the IM server 110. For example, an IM client 102a-n may be a personal computer (e.g., laptop or desktop) or mobile device (e.g., mobile phone) with an instance of the data storage management application thereon, or web browser running thereon. For example, IM client 102a may be a mobile phone with the data storage management application installed thereon whereby the administrator may issue commands, or generally requests, using the application on the mobile phone from anywhere in the mobile network. Each of the IM clients 102*a-n* may connect over a network, such as the internet or public network 104, to the IM server 110. With the IM-based management approach such as illustrated in FIG. 2, the IM server 110 perform processing to authenticate each of the IM clients 102*a-n*. For example, when the data storage management application is executed on IM client 102*a*, the IM client 102*a*/application executing thereon, is authenticated by the IM server 110. For example, the IM client 102*a* may provide credentials, such as a user name/ID and password which are validated or authenticated by the IM server 110. As generally known in the art such as in connection with account management, prior to logging into the IM server 110 where the user name/ID and password for IM client 102*a* are provided, an account may be created for the IM client 102*a*. The account may be a user or administrator account denoting the registration of a particular user of the data storage system management application, such as the user of the IM client 102*a*. In this manner, the data storage management application on IM client 102*a* may execute, connect to the IM server 110, and provide the IM server 110 with authentication information (such as the user name/ID and password). As an example, in connection with data storage system management, a user name/ID or account may be associated with different roles, groups, or other designations which provide authority and/or restrictions in connection with the set of allowable operations, commands, and the like, that a particular user may request. For example, a first account may be created for USER1 where USER1 is only allowed to view or read specific types of configuration information. USER1 may not be allowed to issue any commands which create, delete or otherwise modify existing data storage system configuration information. For example, USER1 may not be allowed to issue commands to provision or create a new LUN, storage group, RAID group, or other entity in the data storage system configuration. However, USER1 may be allowed to view or read existing configuration regarding existing LUNs, RAID groups, and the like. As another example, USER 2 may be allowed to view or read existing data storage system configuration information and may be allowed to provision or create new LUNs. However, USER2 may not be able to configure or create new storage pools, RAID groups, or other entities in the data storage system.

The data storage system 112 may include an IM agent 120 which facilitates control path communications (e.g., IM agent 120 may be embedded in, or part of, the control path framework of the data storage system 112). In at least one embodiment, an account may be created on the IM server 110 for the IM agent 120. When the data storage system 112 is booted or, more generally, the IM agent 120 commences execution, the IM agent 120 may automatically connect 118 to the IM server to log into the IM server 110 in a manner similar to that as described elsewhere herein with respect to the application executing on the IM client 102*a*. In at least one embodiment, the connection 118 may be a LAN (local area network) connection between the IM server 110 and system 112. The IM agent 120 may login to the IM server 110, provide proper and valid authentication information (e.g., user name/ID and password) to the IM server 110, and then join a multi-party chat room (MUC). In a similar manner, the application on the IM client 102*a* may connect to the IM server 110 and also join the same MUC as the IM agent. Additionally, other application instances on other IM clients 102*b-n* may also connect to the IM server 110 and join the same MUC as the IM agent 120 and also the same IM client 102*a*. In this manner, the same IM agent 120 may use the MUC to communicate, through the IM server 110, with each of the IM clients 102*a-n* using IMs. More specifically, an IM client, such as IM client 102*a*, may have multiple IM exchanges with IM agent 120 where such IM exchanges pass through the IM server 110. Through the sequence of multiple IM exchanges and NLP, the IM agent 120 may extract and formulate a request that is a data storage system management request to perform a data storage management operation, task, command, and the like.

Figure 3:
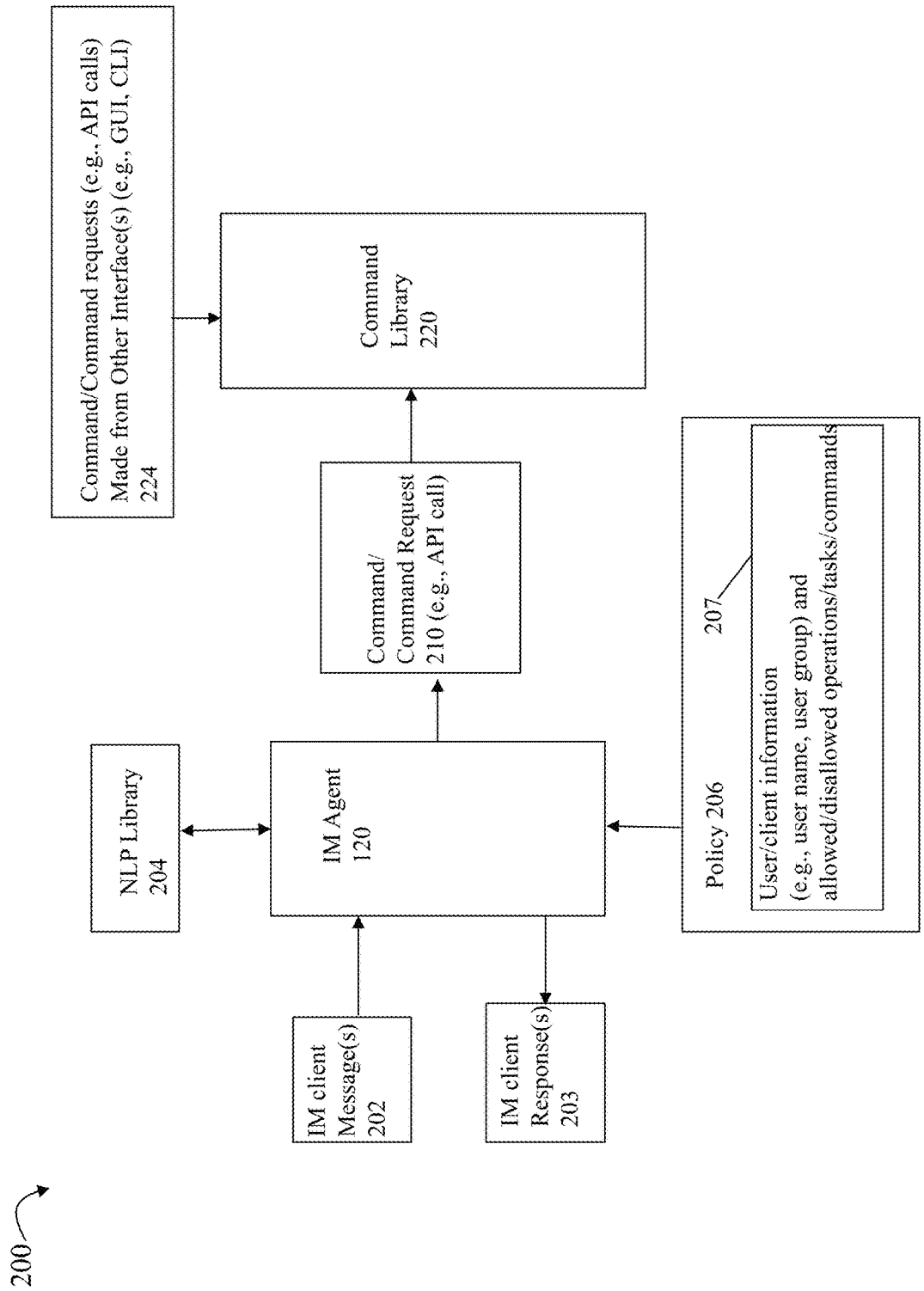

Referring to FIG. 3, shown is an example of components that may be included in an embodiment of the data storage system 112 in accordance with techniques herein. The example 200 provides additional detail of components that may be used in conjunction with the IM agent 120 connected to the MUC on the IM server 110. For example, IM client 102*a* may be connected to the same MUC as the IM agent 120 and may send an IM client message 202 to the IM agent. The IM client message 202 may include information expressing part or all of a data storage command request, such as to create (e.g., provision storage for) a new LUN. The IM agent 120 may receive the IM client message 202 including at least some information regarding a command requested. The IM client message 202 may be input directly entered by the user as text in the form of a natural language input. As described above, the text may be entered, such as via typing or other manual input device. The natural language input in the form of text may be entered as text of an IM on IM client device 102*a*. As also described herein, the user input may be a voice or speech input that may be converted, such as using a converter on the IM client 102*a*, to a text form of the natural language input. Generally, the converter such as may be included on IM client 102*a* may perform conversion from voice to text where the user input is spoken (e.g., voice or speech) and the resulting text form of the natural language input is provided in the form of an IM message 202 forwarded to the IM server 110, and then to IM agent 120. Additionally, the converter on the IM client 120*a* may also perform text to voice conversion for use in embodiments where the IM client response 203 is returned to the IM client 102*a* and then further converted by the IM client 102*a* to a form of voice or speech. For example, the virtual assistants or agents on IM client 102*a* may communicate with a user in the form of voice or spoken language. Such virtual assistants on the IM client 102*a* may include, for example, Siri on the iPhone and other products from Apple Inc., and Cortana available on products from Microsoft Corporation. Thus, an embodiment in accordance with techniques herein may accept user input generally in any one or more forms, such as text and/or voice whereby any input may be converted, as needed, to another form, such as text, which is capable of being included in an IM client message 202 sent to the IM server 110.

In an embodiment where the user input is directly provided in the form of text, the input may be communicated from an IM client, such as IM client 102*a*, to the IM server 110, for forwarding to the data storage system 112 (e.g., IM agent 120). In the case where the user input is in the form of voice or speech input, the user input may first be converted, as described above, from voice to text by the converter on the IM client 102*a*, which may then send the text form of user input in the form of an IM client message to the IM server 110, for further forwarding to the data storage system 112 (e.g., IM agent 120).

In the example 200, the IM agent 120 receives and analyzes the IM client message 202 which is a text form of the natural language input by the user. The IM agent 120 may perform analysis including, for example, performing processing to infer, extract or generally determine information regarding any of a command, question/query, operation, task and the like, being requested by the user. In at least one embodiment in accordance with techniques herein, the IM agent 120 may perform analysis using natural language processing (NLP) techniques. As known in the art, natural language processing (NLP) is a field of computer science, artificial intelligence, and computational linguistics concerned with the interactions between computers and human (natural) languages. As such, NLP is related to the area of human-computer interaction. Many challenges in NLP involve: natural language understanding, enabling computers to derive meaning from human or natural language input; and others involve natural language generation. For example, with NLP, the user text input as provided in the IM client message 202 may be processed in a manner using parsing to recognize structure associated with human natural language, such as question formation, sentence structure (e.g., nouns, verbs), or more generally patterns and language elements expected in connection with human speech and writing. The natural language structure may be based on rules defining such structure expected in connection with human speech patterns and human natural language, such as English (e.g., the text form of the user input may be in the form of a natural language such as English). In at least one embodiment, the IM agent 120 may use functionality included in a NLP library 204 to provide for such parsing, recognition of different parts of speech, and the like.

NLP performed by the IM agent 120 to analyze the natural language input may use, for example, OpenNLP by the Apache Software Foundation. In at least one embodiment, the NLP library 204 may be the Apache OpenNLP library, which is a machine learning based toolkit for the processing of natural language text and supports the most common NLP tasks, such as tokenization, sentence segmentation, part-of-speech tagging/recognition, named entity extraction, chunking, parsing, and co-reference resolution. These tasks are usually required to build more advanced text processing services. OpenNLP also includes maximum entropy and perceptron based machine learning.

As another example, an embodiment may use a different NLP library such as the Natural Language Toolkit (NLTK) available, for example, on the internet at NLTK.org. The NLTK may be characterized as a suite of libraries and programs for symbolic and statistical natural language processing (NLP) for English written in the Python programming language. Although particular libraries or tools, such as those provided by NLTK, may be written in a particular programming language such as the Python programming language, as will be appreciated by those skilled in the art, NLP tools, libraries, and the like, that may be used in an embodiment in accordance with techniques herein may generally utilize code written in any suitable language.

In an embodiment in which the IM agent 120 analyzes the natural language input by performing NLP, a command, query, operation, task, or portions thereof, may be inferred or determined based on the NLP results. For example, NLP may determine whether the natural language input poses a question or a command, may determine the nouns, verbs, and other parts of speech of the written human natural language input. For example, the particular nouns or verbs may be searched to determine whether the detected nouns or verbs match one or more predetermined keywords or phrases associated with a command or task (e.g., action) and possibly associated attributes, arguments or parameters. To further illustrate, nouns, verbs, and the like, may be obtained as a result of NLP performed with respect to the user's natural language inputs of the IM client message 202. The IM agent 120 may perform processing to determine whether there is a match between the extracted nouns, verbs, and the like, obtained as a result of NLP processing of the IM client message 202 and expected or predetermined keywords, phrases and/or punctuation of defined data storage system management operations, tasks, commands, and the like.

As described in more detail below, information for a single command or request to perform a data storage system management operation, such as provision a new LUN, may be derived or extracted, via NLP processing and analysis, from multiple IM client messages 202. Collectively, the extracted information from the multiple IM client messages 202 may be used by the IM agent 120 to construct the single command or command request 210 to provision the new LUN. For example, a first IM client message may include "I want to create a new LUN". The IM agent 120 may perform NLP of the first message and determine that the user wants to provision storage for a new LUN. However, the user has not specified in the first message the required information for the LUN, such as the name of the LUN and storage capacity of the LUN, along with possible optional parameters for the command. The IM agent may send a first response 203 to the IM client requesting the additional required information (e.g., the name of the LUN, storage capacity) as well as optional information. Such optional information may include, for example, a storage pool or RAID group from which the LUN's storage is to be provisioned. In at least one embodiment, the specifying the source of the physical storage resource may be optional and, if omitted, storage may be provisioned from a default set of storage pools or RAID groups. A second IM client message may be received from IM client 102a which includes the name of the LUN, and a storage capacity. At this point, the IM agent 120 may confirm the particulars regarding the provisioning command request with the IM client 102a and request confirmation to proceed with running or executing the provisioning request to create the LUN. The IM agent may send the confirmation request a second IM client response to the second IM client message. The IM client 102a may send a third IM client message indicating to proceed with executing the provisioning request. In response to receiving the third client IM message, the IM agent 120 may form a command or command request and execute the command by making an API call 210 to the command library 220. In at least one embodiment, the command library 220 may generally be a library with a defined API that may be invoked to execute commands/command requests for any supported interface. For example, in at least one embodiment, the data storage management requests may be issued using multiple interfaces including the NLP or IM-based interface as just described, a command line interface (CLI), and a graphical user interface (GUI).

Additionally, prior to executing the command, such as by performing the API call 210 to the command library 220, the IM agent 120 may perform processing to ensure that the IM client 102a has authority or permission to perform the requested provisioning request. In at least one embodiment, the IM agent 120 may determine whether an IM client 102a has sufficient authority to perform the requested command in accordance with a defined policy 206. The policy 206 may include user or IM client information, such as the user name or ID provided by the IM client 102a as part of authentication to the IM server 110. As described above, IM based data storage system management techniques may be integrated with accounts created and configured on the IM server. As part of user account creation and management on the IM server 110, additional information may be specified identifying the particular commands, operations, tasks, and the like, that each user/user account is/is not authorized to perform. Such additional information may also be included in the policy 206 for each corresponding user name/ID. For example, IM client 102a may have logged into the IM server 110 as USER1 described above. In such a case, the IM agent 120 may determine not to issue or executed the provisioning request to create the new LUN since USER1 is not authorized to perform such an operation. As a variation, assume that IM client 102a may have logged into the IM server 110 as USER2 as described above (rather than USER1). In such a case, the IM agent 120 may proceed with issuing or executing the provisioning request to create the new LUN since USER2 is authorized to perform such an operation. Thus, in at least one embodiment, the policy 206 may include user information consistent with that as previously registered with the created user IM client accounts of the IM server 110. The policy 206 may identify the user name/ID and the additional information identifying the particular commands, operations, tasks, and the like, that each IM server user/user account is/is not authorized to perform. In this manner, the IM agent 120 may use the policy 206 to determine whether or not to execute each management request (e.g., requested command, task, operation, and the like) as constructed from the one or more IM client messages 202 from a particular IM client.

In at least one embodiment, each IM client message 202 received by the IM agent 120 may include information identifying the user name/ID as noted above used in connection with authentication and accounts created on the IM server. Accordingly, the IM agent may use the user name/ID, and possibly other user group information that may be included in the IM client message, to lookup information in the policy 206 for the particular user name/ID and determine whether the particular user name/ID is authorized/allowed to perform different requests.

As described above, the IM agent 120 may formulate a single management request using information extracted from multiple IM client messages. As such, the IM agent 120 may maintain and track sufficient state information in a session comprising multiple IM client message-response exchanges to form the request, request additional required and/or optional information, and the like. What will now be described is additional detail regarding how the IM agent 120 may negotiate or obtain request information spanning multiple IM client messages through natural language chatting with an IM client.

In at least one embodiment, the IM agent 120 may be characterized as a service with session context. Once an IM client message is received, the IM agent 120 recognizes and extracts relevant request information from the current message and then merges such newly extract information with any existing context information already stored as state information. The foregoing may be performed in an incremental manner to update the stored context or state information as each IM client message is processed by the IM agent 120. As noted elsewhere herein, this process may involve several interactions or IM message-response exchanges between an IM client and the IM agent. Once the IM agent has received information for a single request, the IM agent may perform the requested management operation.

As described elsewhere herein, such as in connection with FIG. 3, for each IM client message received by the IM agent 120, the IM agent 120 may utilize the technology of NLP, such as embodied in the NLP library 204, to parse the IM client message input from the IM client and extract request information. In connection with a single request or command and associated current context or state, the single request may include an action, target and additional arguments or parameters where the additional arguments or parameters may include optional and/or mandatory parameters. The "action" may identify the particular command, operation, or task. For example, "action" may correspond to "create LUN" or "Provision LUN" command/operation. The "target" may denote the operational or command target, such as the entity being operated upon by the command or request. For example, in connection with a request to create or provision storage for a new LUN, "target" may specifying the LUN or identifier or name of the new LUN currently being provisioned/created. The "additional arguments or parameters" may include, for example, the storage capacity or amount of storage allocated for the new LUN; the storage resource (e.g., pool or RAID group) from which storage is provisioned for the new LUN, and the like. Thus, the current context/state at a point in time for a request may depend on what information has already been acquired or extracted from received IM client messages, and what information has yet to be received for the request. A particular request such as a command to provision storage for a new LUN may have an associated syntax tree, or other suitable structure, reflecting the result of NLP of the received IM client messages.

Determination of whether a particular word in the IM client message is an action, target argument, and the like may be determined in any suitable manner. For example, in at least one embodiment, particular words in an IM client message may be determined as an action, target or argument based on a matching or correspondence between pre-defined keywords. For example, a first set of one or more keywords (and synonyms) may be specified to denote a provisioning request for a LUN. For example, the first set may include "create" and "provision" when paired with another second keyword such as any of: "LUN", "logical device" or "device". Arguments or parameters may be identified in similar manner such as with additional predefined 'type' information. For example, '10g disk' could be easily recognized as 'disk' further annotated or described by '10g', whereby '10g' may be recognized as type 'size' (e.g., interpreted as 10G (gigabytes) of storage/storage capacity. If 'disk' is interpreted as a predefined argument or parameter keyword of 'disk_size' with type 'size', "10g disk" may be interpreted as disk_size=1073741824 bytes (e.g., 10 gigabytes). Thus, in connection with provisioning a new LUN, "10g disk" may be interpreted as specifying the storage capacity for the new LUN being provisioned or created.

In at least one embodiment, the context for a first current command may be 'interrupted' to commence starting a new request, if necessary, such as due to dependency between the first current request and the new request. For example, if we want to create something with a request, it may be necessary to first specify certain storage resources. For example, in connection with provisioning storage for a new LUN, it may be necessary or desirable to first inquire, via a new request, regarding what existing RAID groups or storage pools currently have available capacity to allocate to the new LUN provisioning request. If no RAID group has sufficient available capacity or there are no existing configured RAID groups, the first request to create the new LUN may be interrupted with yet another new request to create or configure a new RAID group. Once the new RAID group is configured/created, creating the new LUN may continue where storage for the new LUN may be provisioned from the newly configured RAID group. In at least one embodiment, the IM agent may maintain a context stack to store the existing/old context for a first request, start processing to create a new second request, and then resume the first request once the new second request has been performed. In this manner, the context for the first command, such as to create the new LUN, may be pushed on the stack while processing is performed for the second new command to create the new RAID group, view information on existing RAID groups, and the like. Once the new RAID has been created, for example, via executing the second new command, processing by the IM agent may resume with the previously pushed context for the first command to create the new LUN. Generally, the IM agent stack may be any suitable depth and thus capable of storing multiple pushed requests and associated sets of context and state information (e.g., context state and also information such as the recognized action, target and parameters received thus far in processing a request).

Behavior regarding the IM agent and associated states and actions performed in at least one embodiment in accordance with techniques herein is described in more detail below with reference to FIGS. 4 and 5 in following paragraphs.

Figure 4:
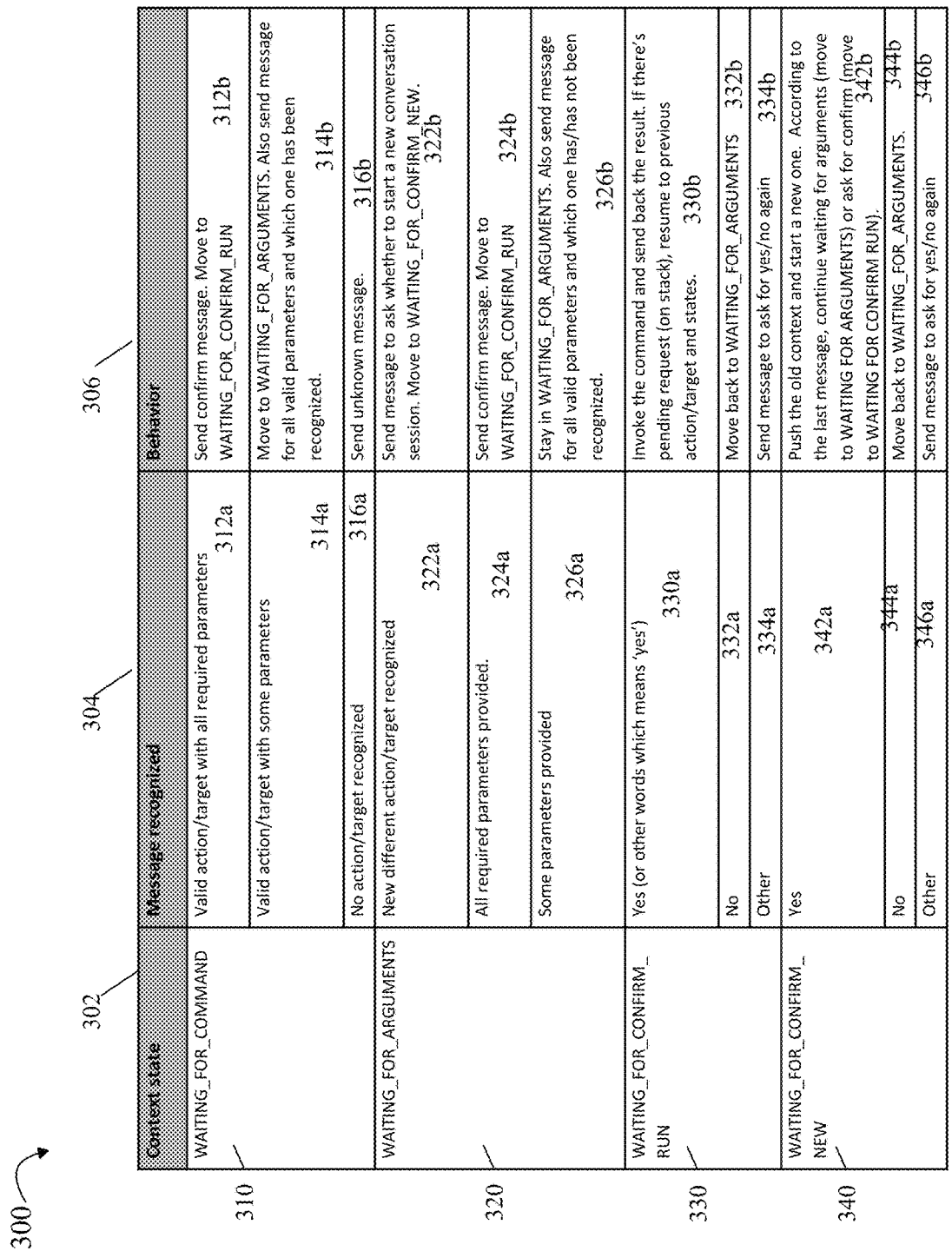
FIG. 4 is an example of a table describing various context states, transitions and actions that may be performed in an embodiment in accordance with techniques herein.

FIG. 4 is an example 300 of a state transition table summarizing a current context state of the IM agent 302, information recognized in the next IM client message 304, and a corresponding resulting behavior or responsive action 306 of the IM agent. FIG. 5 is an example 400 illustrating a state machine of the IM agent as described by the table of FIG. 4.

Figure 5:
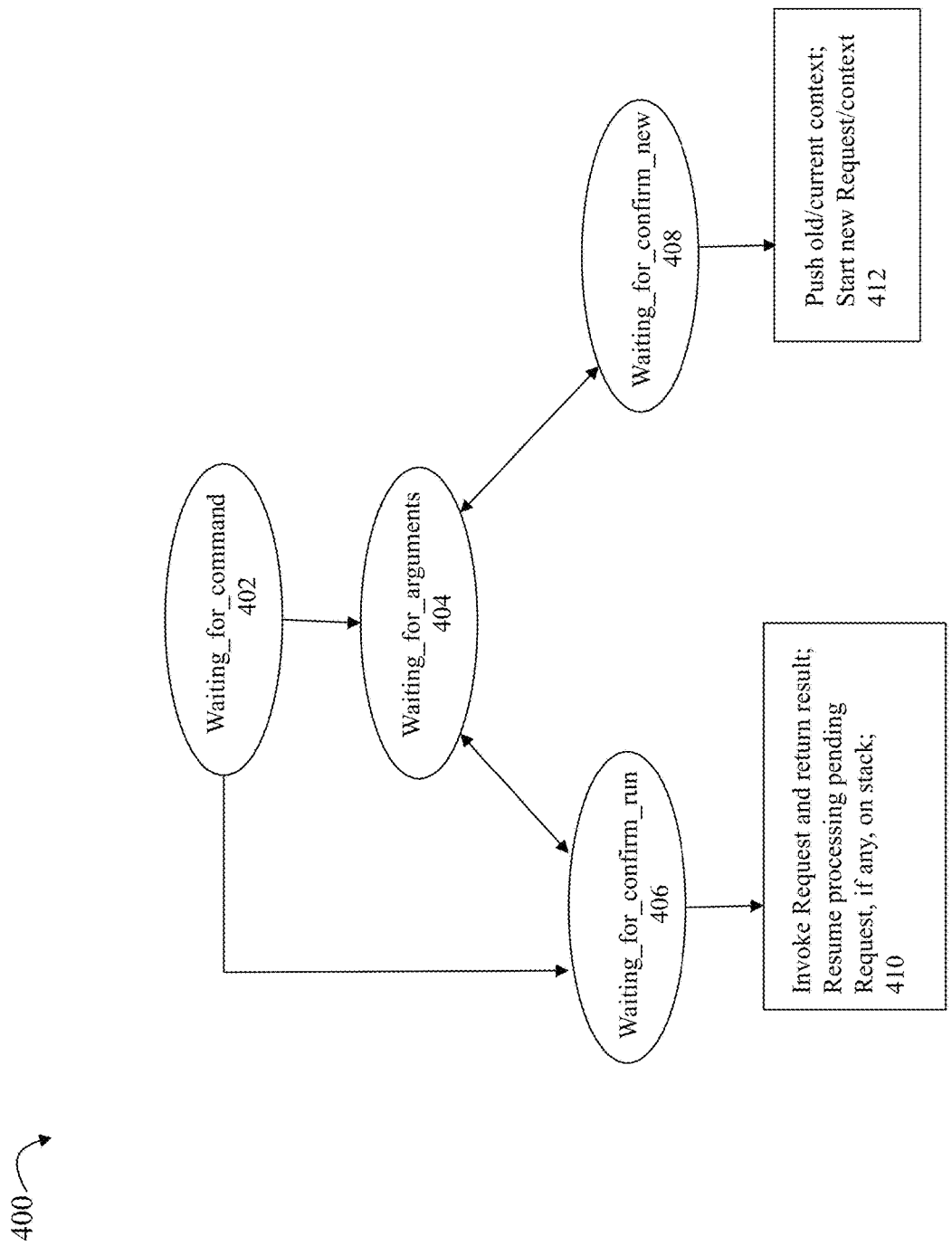
FIG. 5 is an example illustrating a state diagram for processing performed by an 1M (instant messaging) agent in an embodiment in accordance with techniques herein.

Referring to FIG. 5, the diagram includes the following 4 context states of the IM agent in connection with processing a command: Waiting_for_command 402, waiting_for_arguments 404, waiting_for_confirm_run 406 and waiting_for_confirm_new 408. Each of the foregoing 4 context states are also included in column 302 of FIG. 4. When the IM agent is currently in one of the states 402, 404, 406 and 408, a next IM client message is received and recognized as denoted in column 304 of FIG. 4.

As illustrated by row 310, when the current state is waiting_for_command 402, a next IM client message, or next input, received may be interpreted or recognized as one of 3 possible options denoted by 312a, 314a and 316a. If the next input received corresponds to 312a, 314a, or 316a, the responsive behavior or action as denoted, respectively, by 312b, 314b or 316b is performed. If the IM agent is currently waiting for a new/next command (Waiting_for_command is current context state 310) and the next IM client message includes a valid action and target with all/any required parameters 312a, the IM agent (as denoted by 312b) sends a confirmation message to the IM client requesting that the IM client confirm to proceed with executing the requested command. As also indicated by 312b of FIG. 4 and illustrated by the transition arrow from 402 to 406 in FIG. 5, the IM agent transitions to the waiting_for_confirm_run state 406.

If the IM agent is currently waiting for a new/next command (Waiting_for_command is current context state 310) and the next IM client message includes a valid action and target with some but not all required parameters 314a, the IM agent (as denoted by 314b) transitions to the waiting_for_arguments state and sends a message to the IM client. The message sent in connection with 314b from the IM agent to the IM client may indicate all possible parameters for the command (required and optional) and also indicate which parameters have been recognized as provided through extracted IM client message information. In this manner, the IM client will know how the IM agent has interpreted inputs provided in IM client messages and also what additional parameters may be specified/are required. As also indicated by 314b of FIG. 4 and illustrated by the transition arrow from 402 to 404 in FIG. 5, the IM agent transitions to the waiting_for_arguments state 404.

If the IM agent is currently waiting for a new/next command (Waiting_for_command is current context state 310) and the next IM client message does not include a valid recognized target and action 316a, the IM agent (as denoted by 316b) sends a message to the IM client indicating that the last IM client message did not includes a recognized action and target. Additionally, the IM agent remains in its current state of waiting_for_command.

As illustrated by row 320, when the current state is waiting_for_arguments 404, a next IM client message, or next input, received may be interpreted or recognized as one of 3 possible options denoted by 322a, 324a and 326a. If the next input received corresponds to 322a, 324a, or 326a, the responsive behavior or action as denoted, respectively, by 322b, 324b or 326b is performed. If the IM agent is currently waiting for parameters or arguments (Waiting_for_arguments is current context state 320) and the next IM client message is recognized as including a new valid action and target, the IM agent (as denoted by 322b) sends a message to the IM client inquiring whether to start a new conversation or session for the new command and target (as specified and recognized in last IM client message). As also indicated by 322b of FIG. 4 and illustrated by the transition arrow from 404 to 408 in FIG. 5, the IM agent transitions to the waiting_for_confirm_new state 408.

If the IM agent is currently waiting for arguments (Waiting_for_arguments is current context state 320) and all required parameters have been recognized/provided 324a, the IM agent (as denoted by 324b) transitions to the waiting_for_confirm_run state and sends a confirmation message to the IM client. The message sent in connection with 324b from the IM agent to the IM client may request confirmation to perform the currently recognized command. As also indicated by 324b of FIG. 4 and illustrated by the transition arrow from 404 to 406 in FIG. 5, the IM agent transitions to the waiting_for_confirm_run state 406.

If the IM agent is currently waiting for arguments (Waiting_for_arguments is current context state 320) and not all required parameters have been recognized 324b, the IM agent (as denoted by 324b) remains in the waiting_for_arguments state and sends a message to the IM client. The message sent in connection with 324b from the IM agent to the IM client may indicate all possible parameters for the command (required and optional) and also indicate which parameters have been recognized as provided through extracted IM client message information. In this manner, the IM client will know how the IM agent has interpreted inputs provided in IM client messages and also what additional parameters may be specified/are required.

As illustrated by row 330, when the current state is waiting_for_confirm_run 406, a next IM client message, or next input, received may be interpreted or recognized as one of 3 possible options denoted by 330a, 332a and 334a. If the next input received corresponds to 330a, 332a or 334a the responsive behavior or action as denoted, respectively, by 330b, 332b or 334b is performed. If the IM agent is currently waiting confirmation to run or perform a recognized request/command (Waiting for confirm run is current context state 330) and the next IM client message is recognized as yes 330a, the IM agent (as denoted by 330b) invokes or performs the current request/command and returns any result to the IM client. If there is a pending request on the stack (e.g., such as one that was "interrupted"), then the pending prior request processing is resumed. Accordingly, the context state and associated information (e.g., action, target, parameters) for the resumed request are also restored in the IM agent.

If the IM agent is currently waiting confirmation to run or perform a recognized request/command (Waiting for confirm run is current context state 330) and the next IM client message is recognized as no 332a, the IM agent (as denoted by 332b) transitions to the waiting_for_arguments state (e.g., as denoted by the transition from 406 to 404 in FIG. 5).

If the IM agent is currently waiting confirmation to run or perform a recognized request/command (Waiting_for_confirm_run is current context state 330) and the next IM client message is not recognized as either yes or no (e.g., something other than yes or no) 334a, the IM agent (as denoted by 334b) remains in the current context state waiting_for_confirm_run and sends a message to the IM client again requesting a response of yes or no to confirm (yes) or not confirm (no) to proceed with execution of the currently recognized request.

As illustrated by row 340, when the current state is waiting_for_confirm_new 408, a next IM client message, or next input, received may be interpreted or recognized as one of 3 possible options denoted by 342a, 344a, or 346a. If the next input received corresponds to 342a, 344a, or 346a the responsive behavior or action as denoted, respectively, by 342b, 344b, or 346b is performed. If the IM agent is currently waiting confirmation to proceed with a newly recognized action/target and new request (Waiting_for_confirm_new is current context state 340 whereby an old/existing request is still pending/has been interrupted) and the next IM client message is recognized as yes 342a, the IM agent (as denoted by 342b) pushes the context for the current/old request on the stack, and starts collecting context and state information for a new request as indicated in the last received IM client message. The particular context state transitioned to as part of 342b depends on what items of the next/new request have been recognized/provided in the last received IM client message. As indicated by 342b, if all required arguments for the new request are provided, along with the action and target, in the last received IM client message, the IM agent context state may transition to waiting_for_confirm_run state. As also indicated by 342b, if not all required arguments for the new request are provided, along with the action and target, in the last received IM client message, the IM agent context state may transition to waiting_for_arguments state.

If the IM agent is currently waiting confirmation regarding starting context for a new request (current state is waiting_for_confirm_new 340) and the next IM client message is recognized as no 344a, the IM agent (as denoted by 344b) transitions to the waiting_for_arguments state (e.g., as denoted by the transition from 408 to 404 in FIG. 5).

If the IM agent is currently waiting confirmation regarding starting context for a new request (current state is waiting_for_confirm_new 340) and the next IM client message is not recognized as either yes or no (e.g., something other than yes or no) 346a, the IM agent (as denoted by 346b) remains in the current context state waiting_for_confirm_new and sends a message to the IM client again requesting a response of yes or no to confirm (yes) or not confirm (no) to proceed with interrupting processing for a current request and begin processing/context for a new request.

With reference again to the example 400 of FIG. 5, each of the elements 402, 404, 406 and 408 denote context states corresponding to rows 310, 320 33 and 340 of FIG. 4. Additionally, the directional arrows between context state elements 402, 404, 406 and 408 identify possible transitions between states based on additional inputs received or recognized in a next IM client message. Thus, column 304 of FIG. 4 denotes such additional inputs received or recognized and the collective context obtained for the current request; and column 306 denotes the responsive action performed such as transition to a different state, sending a message to the IM client, and the like. Element 410 identifies processing performed corresponding to 330b of FIG. 4 responsive to recognizing "yes" in the next IM client message when the context state is waiting_for_confirm_run 406. As illustrated by 410 (and also 330b), the current request is executed or invoked and results are returned to the IM client. Additionally, the IM agent 120 resumes processing of any pending, interrupted request remaining on the stack. Element 412 identifies processing performed corresponding to 342b of FIG. 4 responsive to recognizing "yes" in the next IM client message when the context state is waiting_for_confirm_new 408. As illustrated by 412 (and also 342b), the current request context is pushed on the stack, and IM agent context state commences with a new request (as recognized in connection with the last received IM client message).

It should be noted that the IM agent 120 may also support additional operations, context states and requests than as illustrated in FIGS. 4 and 5 and described herein. For example, an embodiment may support other requests and operations, such as one that would discard a current context for a current command/conversation (e.g., request such as "action=abort"). In this manner, an IM client may also send via an IM message a request to perform such additional operations. Additionally, the context state and information maintained by the IM agent may be per IM client (since multiple IM clients may be simultaneously chatting or on conversation with the same IM agent).

In connection with the foregoing, such as in 330b of FIG. 4, a pending request (that was previously pushed on the stack/had its processing interrupted) is resumed. In order to resume processing of the pending request, the IM agent may be characterized as performing a context switch or restoration whereby the IM agent state and context information for the pending request is restored to the same state and context as when the pending request was previously interrupted. In a similar manner, such as in 342b of FIG. 4, processing for the pending request may be interrupted if the IM agent detects that a new request is being made prior to invoking or executing the pending request. In such a case where the pending request is interrupted, the IM agent may be characterized as performing a context switch also where the context and state information associated with the pending request is pushed or saved on a context stack structure. The IM agent context and state is then cleared or reinitialized for use with the new request. The IM agent context and state is initialized in accordance with the new request information recognized in the last or most recent IM client message (that triggered the context switch from the pending request to the new request and thus the push of the pending request state and context information on the stack).

In connection with a first set of one or more messages exchanged between an IM client and the IM agent, the first set of messages may be characterized as a first conversation comprised of messages from which information is extracted via NLP for a first request. Similarly, a second set of one or more messages exchanged between an IM client and the IM agent may be characterized as a second conversation comprised of messages from which information is extracted via NLP for a second request. As described herein, the first request may be the pending request interrupted to process the second request. As such, in one aspect, the first conversation of messages exchanged may be interrupted to have a second conversation in which the second set of messages are exchanged to obtain information for the second request that is then executed (prior to completing the first conversation). Once the second request has been executed, the first conversation (e.g. message exchange and associated processing) may be resumed between the IM client and IM agent.

Figure 6:
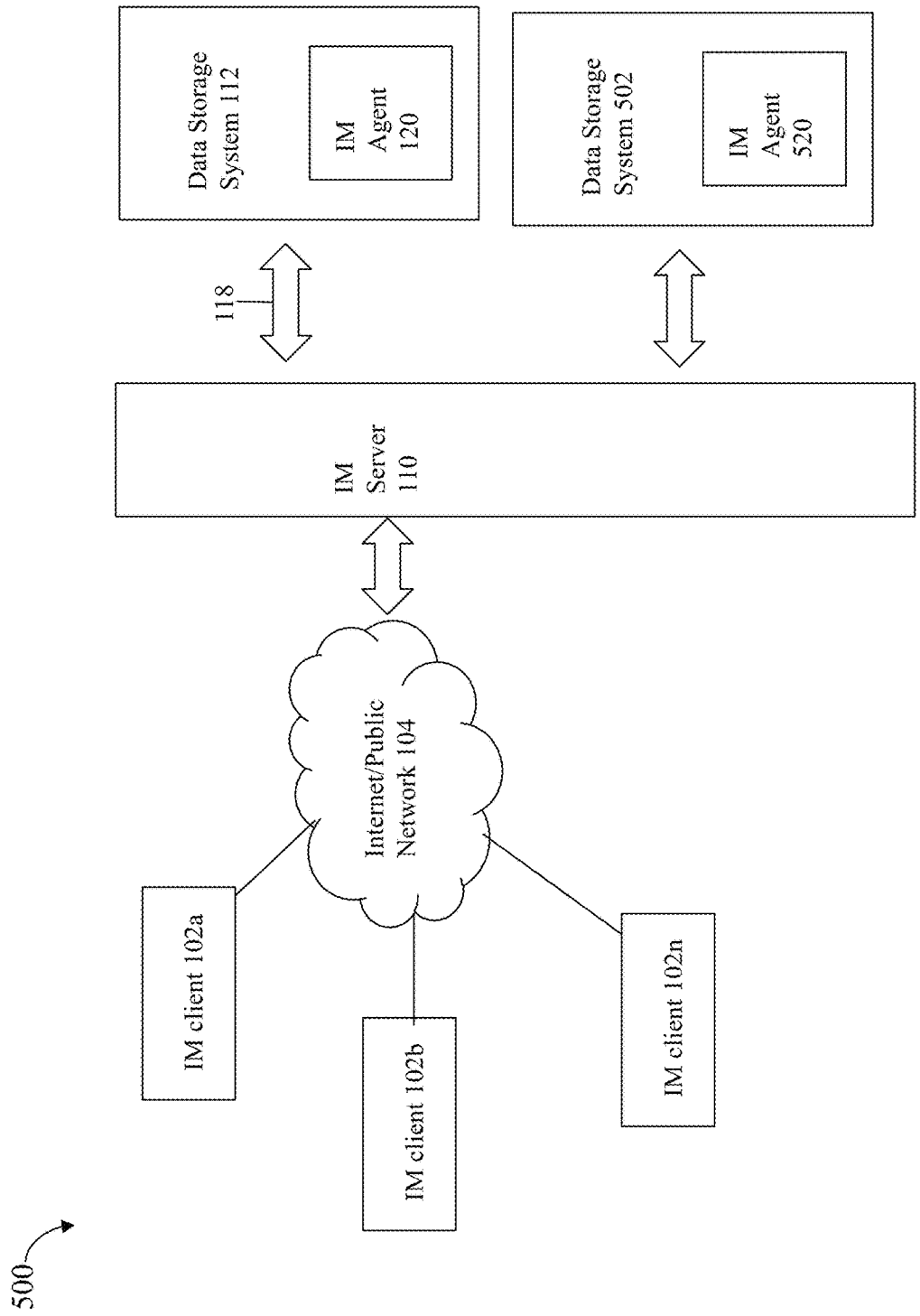

With reference back to FIG. 2, such techniques herein have been illustrated with respect to an example with a single data storage system 112 and its components (e.g., as in FIG. 3). More generally, such techniques may be used in connection with management of multiple data storage systems such as illustrated in FIG. 6. The example 500 of FIG. 6 may include components as illustrated in connection with FIG. 2. Additionally, FIG. 6 includes a second data storage system 502 with IM agent 502. Generally, data storage system 502 may include its own set of components as illustrated in FIG. 3. Although only 2 data storage systems 112 and 502 are illustrated in FIG. 6, more generally, any suitable and supported number of data storage systems may be connected to IM server 110 performing processing as described herein. In this manner, the IM-based management techniques herein may be used to perform the same request (e.g., operation, command, task) on system 112 and 502. For example, the IM client messages for a single request may be simultaneously, in batch, sent from IM server 110 to both data storage system 112 and 502 so the single request may be applied and executed on both systems 112 and 502. In such a system as in FIG. 6, the single request may be issued to each of the systems 112 and 502 from the IM client over the control or command paths.

Figure 7:
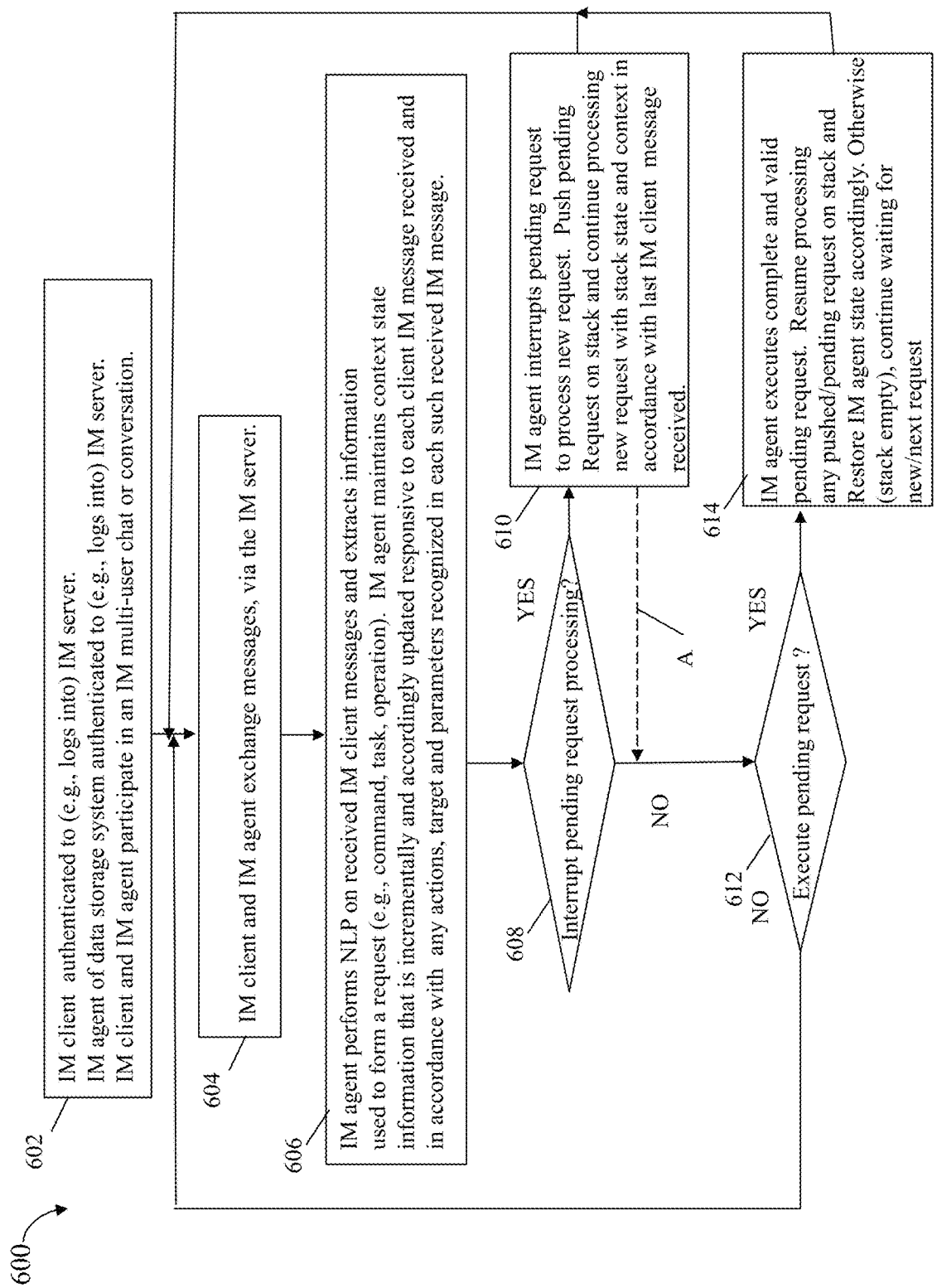
FIG. 7 is a flowchart of processing steps that may be performed in an embodiment in accordance with techniques herein.

Referring to FIG. 7, shown is a flowchart of processing that may be performed in an embodiment in accordance with techniques herein. The flowchart 600 summarizes processing as described above in connection with a single IM client. In step 602, the IM client is authenticated to the IM server whereby the IM client logs into the IM server. In a similar manner, in step 602, the IM agent of the data storage system is authenticated to the IM server whereby the IM agent logs into the IM server. Also, in step 602, the IM client and IM agent participate in an IM chat session or conversation such as an IM multi-user chat or conversation. At step 604, the IM client and IM agent exchange IM messages via the IM server. At step 606, the IM agent performs NLP on received IM client messages and extracts information used to form a request (e.g., command, task, operation). In step 606, the IM agent maintains context state information that is incrementally and accordingly updated responsive to each client IM message received and in accordance with any actions, target and parameters recognized in each such received IM message. In step 608, a determination may be made in accordance with context and state information of the IM agent as to whether to interrupt pending request processing to process a new request (as recognized per last/most recent IM client message).

If step 608 evaluates to yes, control proceeds to step 610. At step 610, the IM agent interrupts pending request processing to process the new request. Step 610 may include pushing the pending request and associated context onto the stack and continue processing the new request with the IM agent context and state in accordance with the last/most recent IM client message received. From step 610, control proceeds to step 604 if the last IM client message received did not include all required information needed for the new request. Alternatively, control may proceeds from step 610 to step 612 (as denoted by dashed line A from 610) if the last IM client message received did include all required information for the new request. In this case, the new request now becomes the current pending request.

If step 608 evaluates to no, control proceeds to step 612 where a determination is made as to whether to process the current pending request. If step 612 evaluates to no, control proceeds to step 604. If step 612 evaluates to yes, control proceeds to step 614. The IM agent executes the complete and valid pending request and returns a result of executing the request to the IM client. Also, in step 614, the IM agent then resumes processing any pushed/pending request on stack and restores the IM agent state and other context information accordingly; otherwise if the stack is empty, processing continues with the IM agent waiting for the next request. From step 614, control proceeds to step 604.

It should be noted that the techniques described herein provide for flexible remote access of the IM client to perform data storage system management requests on any suitable IM client device. Such techniques herein provide for ease of use by having the management request being negotiated or determined by chatting between the IM client and the IM agent where NLP is used to extract information from one or more IM client messages received by the IM agent. Such techniques herein provide for issuing a single management request to one or more data storage systems, such as generally illustrated in FIG. 2 and also FIG. 6. Techniques herein may provide advantages over other techniques, such as using a CLI or GUI that may not be user-friendly or compatible for use on some devices, such as a mobile phone. Additionally, for security reasons, an existing system not using techniques herein may require an administrator to connect to the office network or some other non-public network (e.g., other than over the internet) in order issue data storage management requests over the control path. In contrast, techniques herein provide added security authentication using the IM server whereby an IM client may connect to the IM server over the internet or public network in a secure manner, and the IM agent may also connect and communicate with the IM server in a secure manner. In this way, the IM server may provide a means for secure communication between the IM client and IM agent using natural language messaging.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of performing a data storage management request comprising:
   performing authentication processing in which a server authenticates a client based on user credentials provided by the client and validated by the server, wherein the server facilitates communications between the client and a data storage system whereby subsequent messages sent from the client are forwarded through the server to the data storage system;

receiving, from the client at the server, a set of a plurality of messages;

transmitting, from the server to the data storage system, the plurality of messages; and responsive to the data storage system receiving the plurality of messages, performing processing on the data storage system:

performing natural language processing on the set of the plurality of messages to extract first information used in forming the data storage management request, wherein portions of the first information are incrementally extracted from each message of the set as said each message is received at the data storage system;

prior to executing the data storage management request, determining in accordance with a policy and a user identifier included in the user authentication credentials provided by the client and validated by the server, whether the client has sufficient authority to perform the data storage management request;

responsive to determining the client has sufficient authority to perform the data storage management request, executing the data storage management request in accordance with the first information extracted; and responsive to said executing, sending a response to the client indicating a result of executing the data storage management request, and wherein a plurality of agents on a plurality of data storage systems communicate with the server, wherein the data storage system is one of the plurality of data storage systems and each of the plurality of data storage systems includes a corresponding one of plurality of agents, wherein each of the plurality of agents on the plurality of data storage systems automatically connects to the server, is authenticated to the server by providing valid authentication information, and joins a multi-user chat session with the client that issues the data storage system management request, via the multi-user chat session to the plurality of data storage systems.

2. The method of claim 1, wherein the data storage system includes a first agent of the plurality of agents.

3. The method of claim 2, wherein the client connects to the server, and the first agent connects to the server, and the set of the plurality of messages are sent from the client to the server, and then from the server to the first agent of the data storage system.

4. The method of claim 3, wherein each of the messages in the set of the plurality of messages is transmitted from the client to the server in accordance with an instant-messaging protocol.

5. The method of claim 1, wherein the data storage management request is a request issued over a control path.

6. The method of claim 1, wherein the client is a mobile device running an instant-messaging application.

7. The method of claim 1, wherein the client is a computer system running a browser.

8. The method of claim 1, wherein the client is one of a plurality of clients connected to the server and communicating to the plurality of agents, via the server, in the multi-user chat session.

9. The method of claim 8, wherein a plurality of data storage systems includes the data storage system, the server communicates with the plurality of data storage systems and the client issues the data storage system management request, via the server, to each of the plurality of data storage systems through connections between the server and the plurality of data storage systems.

10. The method claim 1, wherein state and context information regarding processing for the data storage system management request are maintained on the data storage system and updated as each message of the set is processed.

11. The method of claim 10, wherein, prior to receiving all messages of the set for the data storage management command, the method includes performing first processing comprising:

receiving a second set of one or more messages, wherein the second set of one or more messages is sent from the client to the server, and then from the server to the data storage system;

performing natural language processing on the second set of one or more messages to extract second information used in forming a second data storage management request;

interrupting, at a first processing point, a first conversation comprising the set of messages for the data storage management request;

executing the second data storage management request in accordance with the second information extracted; and subsequent to executing the second data storage management request, resuming the first conversation at the first processing point at which said interrupting occurred.

12. The method of claim 11, wherein said interrupting includes retaining first state and context information denoting a first processing state of the data storage management request when interrupted.

13. The method of claim 12, wherein said resuming includes restoring the first processing state of the data storage management request as a current processing state in connection with the data storage management request.

14. A system comprising:

one or more processors; and a memory comprising code stored thereon that, when executed by at least a first of the one or more processors, performs a method of issuing a data storage management request comprising:

performing authentication processing in which a server authenticates a client based on user credentials provided by the client and validated by the server, wherein the server facilitates communications between the client and a data storage system whereby subsequent messages sent from the client are forwarded through the server to the data storage system;

receiving, from the client at the server, a set of a plurality of messages;

transmitting, from the server to the data storage system, the plurality of messages; and responsive to the data storage system receiving the plurality of messages, performing processing on the data storage system:

performing natural language processing on the set of plurality of messages to extract first information used in forming the data storage management request, wherein portions of the first information are incrementally extracted from each message of the set as said each message is received at the data storage system;

prior to executing the data storage management request, determining in accordance with a policy and a user identifier included in the user authentication credentials provided by the client and validated by the server, whether the client has sufficient authority to perform the data storage management request;

responsive to determining the client has sufficient authority to perform the data storage management request, executing the data storage management request in accordance with the first information extracted; and responsive to said executing, sending a response to the client indicating a result of executing the data storage management request, and wherein a plurality of agents on a plurality of data storage systems communicate with the server, wherein the data storage system is one of the plurality of data storage systems and each of the plurality of data storage systems includes a corresponding one of plurality of agents, wherein each of the plurality of agents on the plurality of data storage systems automatically connects to the server, is authenticated to the server by providing valid authentication information, and joins a multi-user chat session with the client that issues the data storage system management request, via the multi-user chat session to the plurality of data storage systems.

15. A non-transitory computer readable medium comprising code stored thereon that, when executed performs a method of using a data storage management request comprising:

performing authentication processing in which a server authenticates a client based on user credentials provided by the client and validated by the server, wherein the server facilitates communications between the client and a data storage system whereby subsequent messages sent from the client are forwarded through the server to the data storage system;

receiving, from the client at the server, a set of a plurality of messages;

transmitting, from the server to the data storage system, the plurality of messages; and responsive to the data storage system receiving the plurality of messages, performing processing on the data storage system:

performing natural language processing on the set of the plurality of messages to extract first information used in forming the data storage management request, wherein portions of the first information are incrementally extracted from each message of the set as said each message is received at the data storage system;

prior to executing the data storage management request, determining in accordance with a policy and a user identifier included in the user authentication credentials provided by the client and validated by the server, whether the client has sufficient authority to perform the data storage management request;

responsive to determining the client has sufficient authority to perform the data storage management request, executing the data storage management request in accordance with the first information extracted; and responsive to said executing, sending a response to the client indicating a result of executing the data storage management request, and wherein a plurality of agents on a plurality of data storage systems communicate with the server, wherein the data storage system is one of the plurality of data storage systems and each of the plurality of data storage systems includes a corresponding one of plurality of agents, wherein each of the plurality of agents on the plurality of data storage systems automatically connects to the server, is authenticated to the server by providing valid authentication information, and joins a multi-user chat session with the client that issues the data storage system management request, via the multi-user chat session to the plurality of data storage systems.

16. The non-transitory computer readable medium of claim 15, wherein the data storage system includes a first agent of the plurality of agents.

17. The non-transitory computer readable medium of claim 16, wherein the client connects to the server, and the first agent connects to the server, and the set of the plurality of messages are sent from the client to the server, and then from the server to the first agent of the data storage system.

18. The non-transitory computer readable medium of claim 17, wherein each of the messages in the set of the plurality of messages is transmitted from the client to the server in accordance with an instant-messaging protocol.

19. The non-transitory computer readable medium of claim 15, wherein the data storage management request is a request issued over a control path.

* * * * *